United States Patent [19]

Davis

[11] 4,204,688

[45] May 27, 1980

[54] OIL CONTROL RING SPACER-EXPANDER WITH IMPROVED SLIP LATCH

[75] Inventor: M. Lewis Davis, Muskegon, Mich.

[73] Assignee: Sealed Power Corporation, Muskegon, Mich.

[21] Appl. No.: 720,274

[22] Filed: Sep. 8, 1976

[51] Int. Cl.² .............................. F16J 9/06; F16J 9/12
[52] U.S. Cl. ........................................ 277/9; 277/139; 277/155; 277/218
[58] Field of Search .................... 277/155, 9, 9.5, 139, 277/140, 218, 219

[56] References Cited

U.S. PATENT DOCUMENTS

| | | | |
|---|---|---|---|
| 2,893,798 | 7/1959 | Olson | 277/139 |
| 3,099,455 | 7/1963 | Mayfield | 277/140 |
| 3,695,622 | 10/1972 | Davis et al. | 277/139 |
| 3,834,716 | 9/1974 | Okada | 277/9 |

Primary Examiner—Lenard A. Footland
Attorney, Agent, or Firm—Barnes, Kisselle, Raisch & Choate

[57] ABSTRACT

In a parted corrugated spacer-expander for use in a piston oil control ring of the type which includes a circumferential series of alternating inner and outer crowns successively connected by radially diverging spring legs having oil drain openings formed therein, an improved slip latch comprising a curved rod having a radius of curvature equal to or less than the free-state radius of curvature of the expander. One end of the latch extends through at least one leg opening adjacent one expander end and terminates in a stop having an axial dimension which prevents passage through the leg openings. The other latch end extends over an arc of at least seventy-five degrees through a plurality of leg openings in the opposite expander end and is free to slide through the leg openings.

6 Claims, 6 Drawing Figures

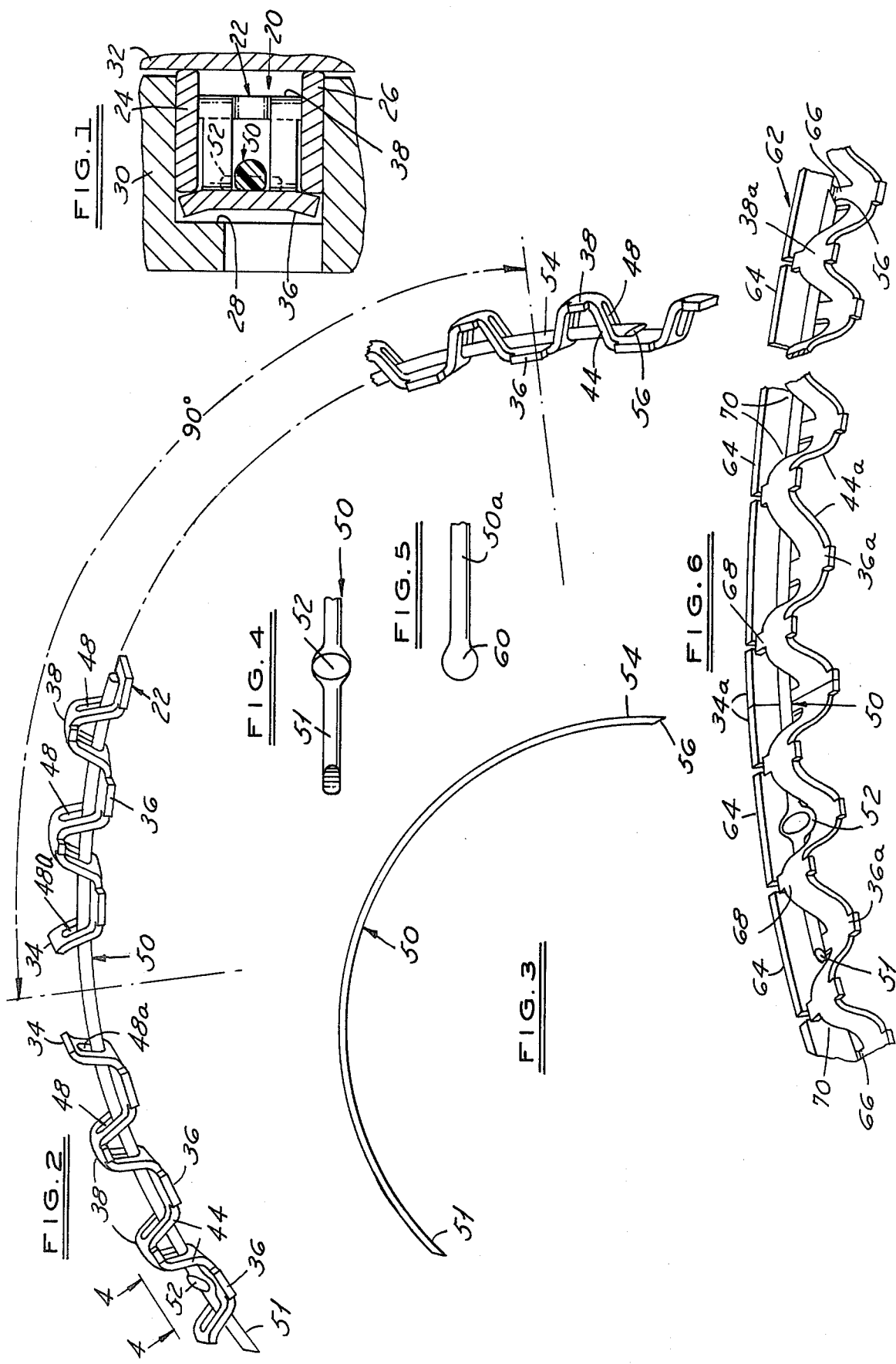

OIL CONTROL RING SPACER-EXPANDER WITH IMPROVED SLIP LATCH

The present invention relates to piston rings and, more particularly, to an improved slip latch and spacer-expander construction for piston oil control rings.

It is an object of the present invention to provide a parted spacer-expander and a slip latch of the type generally shown in Davis et al U.S. Pat. No. 3,695,622 and Okada U.S. Pat. No. 3,834,716 which is simple and economical in construction, and which is reliable in operation for preventing overlap of the spacer-expander ends during installation of the expander and latch into an engine. It is another object of the invention to provide a spacer-expander and a slip latch of the referenced type which allows the parted ends of the expander to be widely separated during handling or during the installation process.

The novel features which are considered to be characteristic of the present invention are set forth in particular in the appended claims. The invention itself, however, together with additional objects, features and advantages thereof, will be best understood from the following description when read in conjunction with the accompanying drawings in which:

FIG. 1 is a radial sectional view of an oil control ring, including a spacer-expander and a slip latch in accordance with the invention, installed in an internal combustion engine;

FIG. 2 is a perspective view showing the improved spacer-expander and slip latch provided by the invention;

FIG. 3 is an elevational view of the slip latch prior to installation into the spacer-expander;

FIG. 4 is a sectional view of the stop or deformation provided in the latch of FIG. 2, and is taken along the line 4—4 of FIG. 2;

FIG. 5 is a view similar to that of FIG. 4 depicting an alternative embodiment of the latch stop; and FIG. 6 is a perspective view showing the slip latch provided by the invention disposed in an alternative embodiment of the spacer-expander.

Referring to the drawings, and particularly to FIGS. 1 and 2, piston ring 20 comprises a generally circular spacer-expander 22 and the upper and lower annular metal rails 24,26 respectively. FIG. 1 shows piston ring 20 installed in a ring groove 28 extending circumferentially around a piston 30. Spacer-expander 22 urges rails 24 and 26 against a cylinder 32 of an internal combustion engine so as to provide a seal therebetween and to wipe the wall of cylinder 32 as piston 30 reciprocates therein.

Spacer-expander 22 is constructed in a progressive blanking and bending operation from a strip of metal into a generally circular radially corrugated form having the parted ends 34 adapted for abutment in the free-state of the expander. Ends 34 separate as spacer-expander 22 is opened for assembly to piston 30, as seen in FIG. 2, and return to an abutting relationship when spacer-expander 22 is in groove 28. Spacer-expander 22 comprises a plurality of inner crowns 36 and outer crowns 38. Outer crowns 38 are spaced radially outwardly of inner crowns 36 and each outer crown 38 is also circumferentially interposed between circumferentially adjacent inner crowns 36. This arrangement provides an alternating progression or series of outer and inner crowns around spacer-expander 22. The outer crowns 38 and inner crowns 36 are connected by legs 44. Legs 44 are radially inclined and are curved at the ends to blend into crowns 36 and 38, and to lend a generally corrugated appearance to expander 22 when viewed from the radial direction.

An oil drain opening 48 is provided in each leg 44. In the expander embodiment depicted in FIGS. 1–3, openings 48 are in the form of oblong slots, each slot being disposed at about the axial center of the corresponding leg 44 and having a slot axis extending generally in the radial direction. Slots 48 have substantially identical radial dimensions extending between corresponding outer and inner crowns 38,36, with the exception of slots 48a at expander ends 34 which have a slightly reduced radial dimension because of the absence of a corresponding outer crown. The spacer-expander thus far described is substantially identical to that disclosed in Olson U.S. Pat. No. 2,893,798.

A slip latch 50 is provided to keep expander ends 34 in alignment during the assembly operation. Slip latch 50 comprises a curved rod, preferably of nylon or other high-temperature plastic material, having a natural or free-state radius of curvature, as best seen in FIG. 3, which is equal to or, preferably, slightly less than the radius of curvature of expander 22 in its closed or free-state condition. A first end 51 of latch 50 extends through at least slot 48a, and preferably through several additional slots 48 adjacent one expander end 34, and terminates in an axially formed stop or deformation 52. Deformation 52 prevents latch 50 from sliding in the circumferential direction more than the distance between two adjacent legs 44. In the opposite expander end 34, a second end 54 of latch 50 extends through a plurality of slots 48 over an arc of at least seventy-five degrees from the abutted expander ends in the free-state condition of the expander, and preferably over an arc in the range of ninety to one hundred thirty-five degrees. End 54 contains no stop or deformation and is thus free to slide through leg openings 48. Free latch end 54 terminates in an inwardly directed beveled or slanted face 56 to allow free end 54 to ride over the opposing edges of inner crowns 36 as the free end is slid through the corresponding openings 48. Latch 50 is preferably substantially D-shaped in radial cross section, as best seen in FIG. 1, with the flat edge of such cross section being disposed at the inside radius of the latch.

Slip latch 50 possesses several significant advantages over prior art latches of the type described in the above-referenced Davis et al and Okada patents. For example, in accordance with one important aspect of the invention it has been realized that the combination of a long free end 54 and a natural radius of latch curvature which is equal to or less than that of the expander results in a latch which inherently tends to resist rotation about its curved axis. Hence, stop 54 may be formed in the axial rather than the radial direction with reference to the expander axis, thereby eliminating the requirement for ensmalled openings near expander ends 34 as taught by Davis et al and Okada. Furthermore, provision of a lengthened free end 54 allows expander 22 to be widely opened during the assembly operation, while beveled face 56 prevents binding during closure of the expander which may otherwise result because of the latch natural curvature. Moreover, stop 52 may be readily formed without the use of a complicated, multiple-step operation of the type taught in Davis et al. More specifically, after latch 50 has been installed into expander 22 and while the latch is being held in place, stop 52 may be formed by merely mechanically crimping or radially compressing a portion of latch end 51 between adjacent expander legs 44 to form a stop having an axial dimension greater than the axial width of openings 48. Alternatively, stop 52 may be formed by touching a hot iron onto an exposed radially outer edge of the latch such that a surrounding portion of the latch is melted and radially compressed. As a second alternative, a flat circular tab 60 or a sphere may be formed on the latch end, as depicted in FIG. 5.

Although the invention has been thus far illustrated and discussed in connection with a spacer-expander and oil control ring of the type disclosed in the above-referenced Olson, Davis et al and Okada patents, it will be apparent that slip latch 50 is equally useful in combination with many other expander types. For example, FIG. 6 illustrates a latch 50 in use with an expander 62 of the type disclosed in Burns et al U.S. Pat. No. 3,124,364. In expander 62, rail 26 (FIG. 1) is replaced by a circumferential array of generally arcuate support pads 64 extending radially outwardly from inner crowns 36a, each pad 64 being integrally connected along its inner edge to a corresponding inner crown 36a by a pad leg 66. The outer peripheral edge of each pad 64 is disposed outwardly of outer crowns 38a and is curved in an arc having a diameter equal to the diameter of cylinder 32 (FIG. 1) so that pads 64 act as oil scraping elements in the assembled and operating condition of the control ring. The circumferential edges of pads 64 may be slightly beveled to prevent scoring of the cylinder wall. Outer crowns 38a extend at 68 in the direction of pads 64 to space the pads from the outer crowns, and to thus provide an open region between the pads and the spring corrugations which cooperate to form oil drain slots or openings 70 in the expander legs 44a. Slip latch 50 extends through leg openings 70 on opposite sides of expander ends 34a.

Slip latches of materials other than the preferred nylon are also envisioned. For example, latch 50 may be of metal spring wire, in which case stop 52 may be formed by bending the end of the latch in the axial direction. Alternatively, the latch could be cemented or welded to an expander crown between legs. This latter alternative is not presently preferred because attachment of the latch to the expander involves an extra manufacturing step which increases the cost of the expander assembly. However, the invention is intended to embrace the above-noted and all other alternatives and modifications as fall within the spirit and broad scope of the appended claims.

The invention claimed is:

1. In combination with a corrugated circular spacer-expander for use in a piston oil control ring having a free-state radius of curvature and parted expander ends, and including a plurality of alternating concentric circumferentially spaced inner and outer crowns integrally interconnected by a plurality of generally diverging legs and oil drain openings formed one in each of said plurality of legs, and improved slip latch comprising a rod having one end extending through at least one leg opening adjacent one end of said spacer-expander and having a stop formed in said one end between spacer-expander legs and dimensioned in the axial direction to prevent passage of said stop through said leg openings, said stop having a dimension in the radial direction which is less than the corresponding radial dimension of said leg openings, said rod further having a second end extending through a plurality of leg openings in the opposing spacer-expander end, said second end being free to slide through said plurality of leg openings.

2. The slip latch set forth in claim 1 wherein said rod has a natural radius of curvature equal to or less than said radius of curvature of said spacer-expander.

3. The slip latch set forth in claim 2 wherein said second end of said rod extends through said plurality of openings over an arc of at least seventy-five degrees in said free-state condition of said spacer-expander.

4. The slip latch set forth in claim 7 wherein each said leg opening comprises a slot disposed centrally in a corresponding leg and having a slot axis extending generally in the radial direction.

5. In combination with a circular spacer-expander for use in a piston oil control ring having a free-state radius of curvature and parted expander ends, and including a plurality of alternating concentric circumferentially spaced inner and outer crowns integrally interconnected by a plurality of generally diverging legs and substantially identical oil drain openings formed one in each of said plurality of legs, and improved slip latch comprising a rod having a radius of curvature equal to or less than said radius of curvature of said spacer-expander, said rod having one end extending through at least one leg opening adjacent one end of said spacer-expander and having a stop formed in said one end between adjacent legs and dimensioned in the axial direction to prevent passage of said stop through said leg openings, said rod having a dimension in the radial dimension which is less than the corresponding radial dimension of said leg openings, said rod further having a second end extending through a plurality of leg openings in the opposing spacer-expander end over an arc of at least seventy-five degrees in said free-state of said spacer-expander and being free to slide through said plurality of leg openings.

6. The combination set forth in claim 5 wherein said second latch end extends through said leg openings over an arc in the range of ninety to one hundred thirty-five degrees.

* * * * *

UNITED STATES PATENT AND TRADEMARK OFFICE
CERTIFICATE OF CORRECTION

PATENT NO. : 4,204,688
DATED : May 27, 1980
INVENTOR(S) : Lewis M. Davis

It is certified that error appears in the above-identified patent and that said Letters Patent are hereby corrected as shown below:

Column 2, Line 55, "54" should read -- 52 --.

Column 4, Claim 4, Line 23, "7" should read -- 1 --.

Signed and Sealed this

Thirtieth Day of September 1980

[SEAL]

Attest:

SIDNEY A. DIAMOND

Attesting Officer

Commissioner of Patents and Trademarks